United States Patent [19]
Jonsson

[11] Patent Number: 5,600,931
[45] Date of Patent: Feb. 11, 1997

[54] STRUCTURAL BEAM FOR SUPPORTING AND REINFORCING A STRUCTURE

[75] Inventor: Martin Jonsson, Luleå, Sweden

[73] Assignee: Plannja Hardtech AB, Luleå, Sweden

[21] Appl. No.: 409,806

[22] Filed: Mar. 24, 1995

Related U.S. Application Data

[63] Continuation-in-part of PCT/SE93/00760, Sep. 20, 1993.

[30] Foreign Application Priority Data

Sep. 25, 1992 [SE] Sweden ................................. 9202769

[51] Int. Cl.$^6$ .................................................... E04C 3/30
[52] U.S. Cl. ...................... 52/770.3; 52/726.2; 296/146.6
[58] Field of Search ................................. 52/433, 724.1, 52/726.1, 726.2, 729.3, 729.5, 730.4, 731.2, 731.6, 735.1, 720.3; 296/146.6; 49/501, 502

[56] References Cited

U.S. PATENT DOCUMENTS

| | | | |
|---|---|---|---|
| 3,862,802 | 2/1975 | Murphy | 52/731.7 X |
| 4,307,911 | 12/1981 | Pavlik | 296/146.6 X |
| 4,796,946 | 1/1989 | Wilson et al. | |
| 4,838,606 | 6/1989 | Furubayashi et al. | |
| 4,948,196 | 8/1990 | Baba et al. | |
| 5,348,365 | 9/1994 | Elsenheimer et al. | 296/146.6 |

FOREIGN PATENT DOCUMENTS

0038941  8/1986  Sweden.

*Primary Examiner*—Carl D. Friedman
*Assistant Examiner*—Creighton Smith
*Attorney, Agent, or Firm*—Thomas N. Ljungman

[57] ABSTRACT

A bar construction comprising a generally trapezoidal and open cross-sectional configuration which includes a center-flange (6), two webs (7) which embrace the center-flange, and side-flanges (8) which extend outwardly from a respective side of the bar and connect with respective web (7). The bar may optionally include a first section (1) of constant cross-section in the center part of the bar. The bar includes at least one second section (2) which has a center-flange (6) whose width (b) decrease towards one end (5) of the bar. A transition part (3,4) of generally trapezoidal configuration is provided between the second section (2) and the end (5) of the bar. The second section (2) has side-flanges (8) whose widths (c) decrease towards one end of the bar. The second section (2) has a generally constant height (h).

13 Claims, 4 Drawing Sheets

STRUCTURAL BEAM FOR SUPPORTING AND REINFORCING A STRUCTURE

CROSS-REFERENCE TO RELATED APPLICATION

The present application is a continuation-in-part application of International Patent Application No. PCT/SE 93/00760, filed on Sep. 20, 1993, which claims priority from Swedish Patent Application No. 9202769-7, filed on Sep. 25, 1992. International Patent Application No. PCT/SE 93/00760 was pending as of the filing date of the present application and designated the U.S.A. as a designated state.

BACKGROUND OF THE INVENTION

1. Field of the Invention

The present invention generally relates to a structural beam or bar for supporting and reinforcing a structure. A bar or beam construction can generally have a trapezoidal cross-sectional shape which is preferably open. The cross-sectional configuration of the bar or beam can include a central flange which is embraced or flanked by two webs, each of which webs has, connected thereto, a respective side-flange. Each side-flange extends outwardly on a respective side of the bar construction.

2. Background Information

Bar or beam structures are used in several different aspects or contexts. One common application is the use of such bar structures as barriers along highways and roads to prevent vehicles from running off the road in the event of accidents.

A bar is known from Swedish Patent Specification SE-C-434 245. As described therein, the bar has a closed cross-section which is constant along the full length of the bar.

From the point of view of manufacture, however, it is preferred to provide the bar with an open cross-section, thereby resulting in lower manufacturing costs and also lower surface treatment costs against corrosion, etc. Hitherto known bars or beams of open cross-section, however, have generally not been satisfactory with regard to their energy-absorbing capacity in relation to the weight of the bars. Bars of open cross-section have been found to require very large wall thicknesses in order to be able to withstand forces in such a manner that the bar webs are not moved apart.

OBJECT OF THE INVENTION

An object of the present invention is to provide a bar structure which has a generally trapezoidal cross-section, preferably being an open cross-section, wherein the drawbacks associated with hitherto known bars or beams can essentially be eliminated.

SUMMARY OF THE INVENTION

In cross-section, a safety bar of the present invention, according to at least one preferred embodiment, includes a center-flange which is embraced or flanked by two webs with which a respective side-flange projecting out from each side of the bar connects. A safety bar of the present invention may include a first section of constant cross-section located in the center part of the bar, from which the bar tapers outwardly towards both ends thereof. It lies within the purview of the present invention, however, to omit this central first section, in which case the bar will taper towards its respective ends essentially directly from the midway point of the bar.

A one-sided bar also lies within the purview of the invention, however, meaning a bar which tapers from a larger cross-section out towards a narrowing cross-section, or tapers asymmetrically towards respective ends thereof.

A safety bar in accordance with at least one preferred embodiment of the present invention is characterized in that it comprises at least one second section. This at least one second section can preferably include a central flange whose width decreases towards one end of the bar. The height of this second section will preferably be constant and at least one of the bar webs may connect with an outwardly directed side-flange whose width decreases towards one end of the bar.

A safety bar in accordance with at least one preferred embodiment of the present invention may also include at least one third section which is located between the second bar section and one end of the bar, and which includes a central flange of generally constant width, the central flange having a height which decreases towards one bar end.

At least one fourth section may also be included, and can preferably be located between the third section and one bar end. The at least one fourth section can preferably have a central flange of constant width and a height which decreases towards one bar end down to the metal-plate thickness of the bar.

The center-flanges of respective sections will preferably lie in one and the same plane, whereas the side-flanges will lie in different planes which are inclined relative to one another in correspondence with the decreasing height of the bar towards said one bar end. It also lies within the purview of the invention, however, for the side-flanges in respective sections to lie in one and the same plane, wherein the center-flange of respective sections will be located in different planes corresponding to the decreasing height of these flanges towards the bar end in question. The webs will preferably have the same height on both sides of the bar, although webs of different heights also lie within the purview of the present invention, wherein the side-flanges may also be located in different planes. The center-flange may also slope on both long sides of the safety bar, preferably by giving the bar web on one long side a smaller height than on the other long side when the side-flanges are located in one and the same plane.

Because the width of the center-flange and the side-flanges of the second section decrease towards the bar end, and because the height of the optional third section and the optional fourth section also decreases, it is impossible, or at least difficult, for the bar web to be bent outwards and parted when the center-flange is subjected to load. This prevents the safety bar from being flattened upon impact, or at least renders such flattening difficult.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

In summary, one aspect of the invention resides broadly in a structural beam comprising: a terminal portion; a force-absorption portion disposed remotely from the terminal portion; an intermediate portion disposed between the terminal portion and the force-absorption portion; the force-absorption portion comprising: a first side portion, a second side portion and a third side portion; the second side portion comprising a force-absorbing surface portion for absorbing forces applied to the force-absorbing portion; the first and third side portions each extending from the second side portion; the force-absorption portion having an open cross-section formed at least partly by the first, second and third side portions; the structural beam defining a longitudinal direction, the open cross-section of the force-absorption portion being defined generally perpendicularly with respect to the longitudinal direction; the force-absorbing surface portion having a width defined generally perpendicular direction with respect to the longitudinal axis; the force-absorbing portion having a first end and a second end; the first end being disposed adjacent the intermediate portion and the second end being disposed away from the intermediate portion; and the width of the force-absorbing surface portion decreasing along the force-absorption portion, from the second end to the first end.

BRIEF DESCRIPTION OF THE DRAWINGS

Further details and characteristic features of a safety bar, according to at least one preferred embodiment of the present invention, will be evident from the following description made with reference to the accompanying drawings. Thus, the present invention will now be described in more detail with reference to the accompanying drawings, in which.

DESCRIPTION OF THE PREFERRED EMBODIMENT

Figures 1, 2:
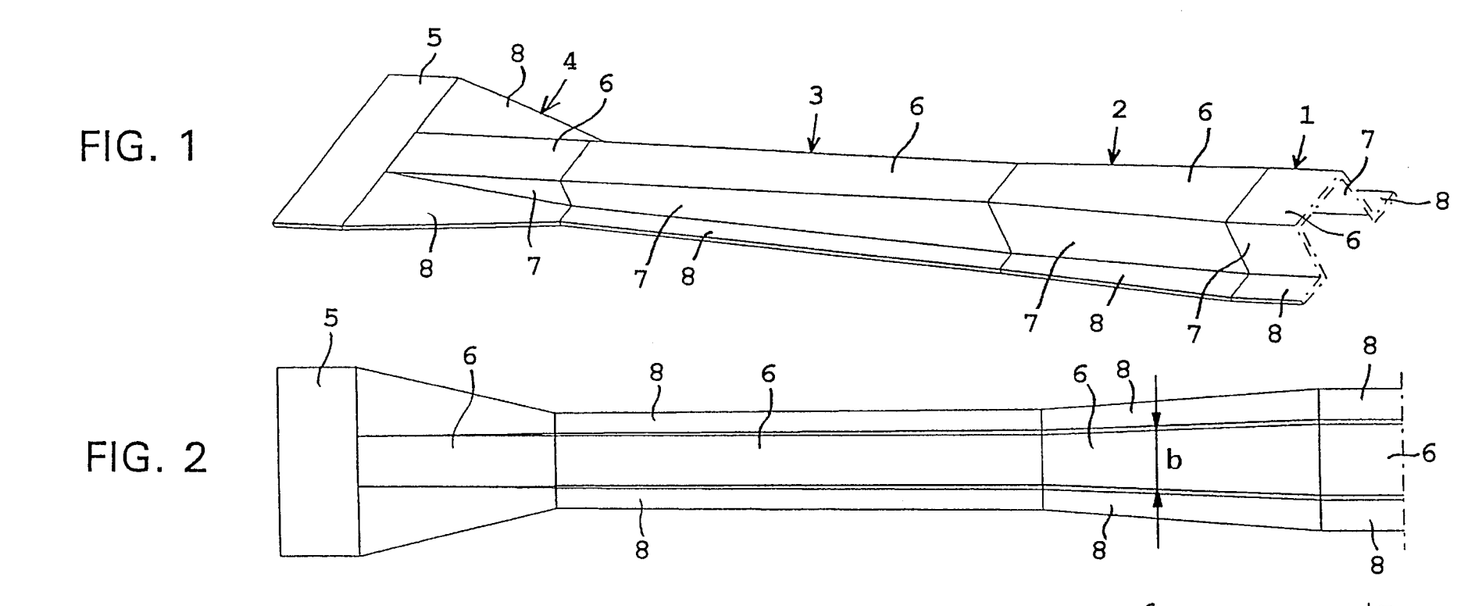
FIG. 1 is a perspective side view of a safety bar, as seen in a direction towards its load absorbing side.
FIG. 2 is a view of the safety bar shown in FIG. 1 as seen immediately from its load-absorbing side.
Figure 3:
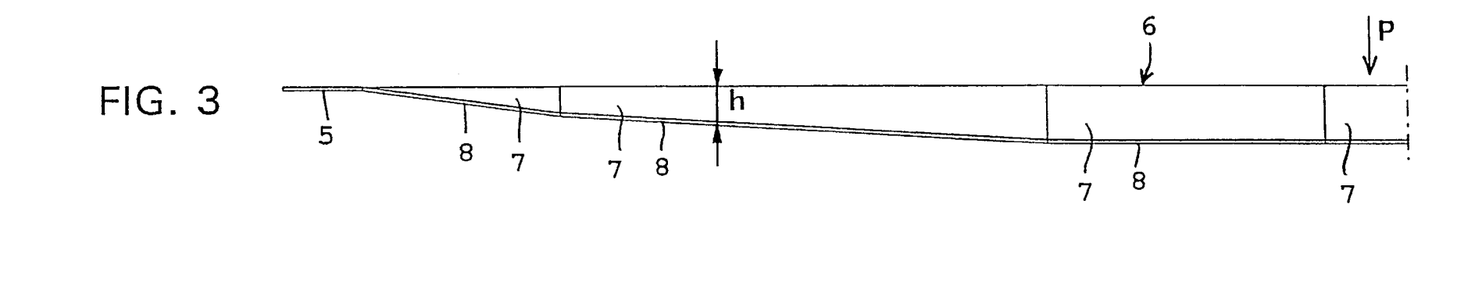
FIG. 3 illustrates the safety bar shown in FIGS. 1 and 2 as seen from one long side of the bar.

The safety bar illustrated in FIGS. 1–3 is preferably symmetrical about a first central section 1, although these Figures illustrate essentially solely that part of the bar that extends from one end of the bar and slightly into the first section 1 at the center of the bar.

As stated heretofore, a one-sided bar also lies within the purview of the present invention, i.e. a bar which tapers from a larger cross-section out towards a narrowing cross-section, or tapers asymmetrically towards respective ends thereof. In this respect, FIGS. 1–3 can also be taken to be illustrative of a whole one-sided bar in accordance with an embodiment of the present invention.

The bar preferably has a generally uniform trapezoidal cross-section and preferably includes, adjacent to the first section 1 on both sides thereof, a second section 2 of generally constant height (h) (see FIG. 3), and having a width (b) (see FIG. 2) which preferably decreases towards respective ends of the bar.

Preferably provided adjacent respective second sections 2 is a third section 3 of essentially constant width (b), but whose height (h) decreases towards respective ends of the bar.

Respective third sections 3 are preferably terminated at respective bar ends by a fourth section 4 of constant width (b) and a height (h) which decreases towards the bar end down to the metal-plate thickness of the bar. Respective fourth sections 4 each preferably carry a mounting part 5 by means of which the safety bar can be fitted to a vehicle, for instance, preferably in the sides or doors of the vehicle.

In the context of fourth sections 4, it should be understood that width (b), as discussed immediately above, refers only to the width of center-flange 6.

The trapezoidal cross-sectional shape of the safety bar in the first section 1 will be evident from FIG. 1, from which it will also be seen that the bar preferably includes a center-flange 6 which is embraced by two webs 7 of mutually equal height. Each web 7 preferably connects with a side-flange 8 which extends out from the safety bar on each side thereof, the two side-flanges 8 being located essentially in one and the same plane.

Figure 4A:
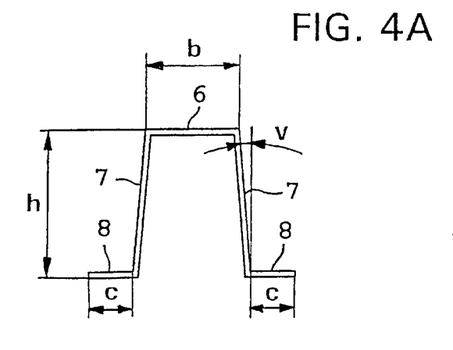
FIGS. 4A–G illustrate alternative embodiments of the cross-sections of the safety bars shown in FIGS. 1 to 3.
Figure 4B:
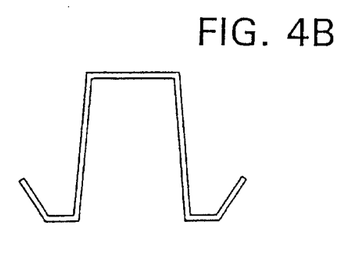
Figure 4C:
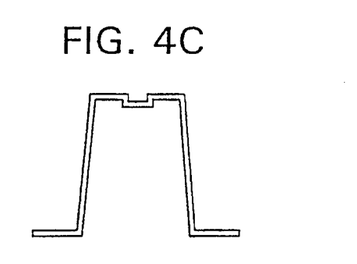
Figure 4D:
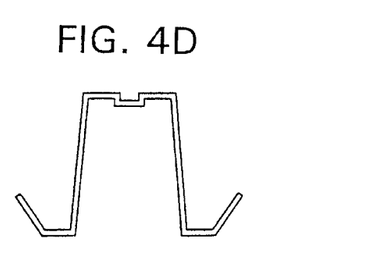
Figure 4E:
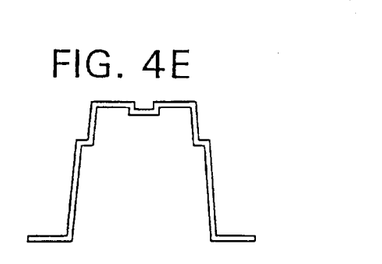
Figure 4F:
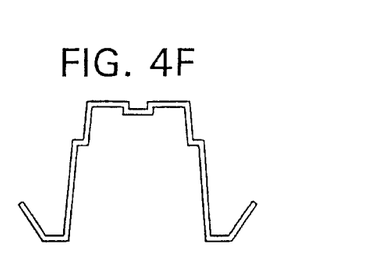

The cross-sectional configuration described immediately above is also shown in FIG. 4A. As shown in FIG. 4A, respective webs 7 preferably slope at an angle (v) to the vertical of the plane extending through the side-flanges 8, so that the center-flange 6 will preferably have a width (b) that is smaller than the distance between the inner edges of the side-flanges 8. In the illustrated case, the web 7 can preferably slope at an angle (v) of 5°, although this angle may conceivably be anywhere in the range of from about 0° to about 10°.

The bar cross-section in the second section 2 preferably includes a center-flange 6 which is of constant height (h) and whose width (b) preferably decreases towards the end of the bar. In this case, the angle (v) at which the web 7 slopes is preferably constant and is essentially equal to the slope angle in the first section 1. The width (c) of the side-flanges 8 preferably decreases in a direction towards the bar end. In the illustrated case, this decrease can preferably be about 33% of the width applicable to the first section 1. However, the width (c) of the side-flanges 8 may decrease by up to 60% of the width (c) applicable to the first section 1. In the illustrated case, the width (b) of the center-flange 6 decreases by about 35% of the width (b) applicable to the first section 1. The center-flange 6 in the second section 2, however, is located in the same plane as that which extends through the center-flange 6 in the first section 1. According to an alternative embodiment of the safety bar according to the present invention, the first section 1 can be omitted, in which case the two second bar sections 2 will be connected to one another at their respective ends of greatest cross-section.

The cross-sectional configuration of the safety bar in the third bar section 3 preferably includes a center-flange 6 of constant width (b) and a height (h) which decreases towards the end of the bar. The center-flange 6 of the third section 3, however, is preferably located in the same plane as the plane that passes through the center-flange 6 in the second bar section 2. In the illustrated case, the height (h) decreases by about 50% from the height applicable to the second section 2. In this case, the web 7 slopes at essentially the same angle (v) as in the first section 1 and the second section 2. The width (c) of the side-flanges 8 are constant in this case and equal to the narrower width (c) applicable to the second bar section 2.

The cross-sectional configuration of the bar in the fourth section 4 preferably includes a center-flange 6 of constant width (b) and a height (h) which decreases essentially down to zero. In this case, the width (b) of the center-flange 6 is equal to the width of the center-flange 6 in the third section 3. The center-flange of the fourth section 4, however, is preferably located in the same plane as that which passes through the center-flange 6 in the third section 3. In the illustrated case, the height (h) decreases from the smaller height (h) applicable to the third section 3 down to the thickness of the metal plate at the end of the fourth section 4. The width of the side-flanges 8 increases towards respective ends of the bar. In the case of the illustrated embodiment, this increase is about 300% from the width applicable to the third section 3, so that the combined widths (b and c) of the center-flange 6 and the two side-flanges 8 will essentially equal the width of the mounting part 5, which is flat and located in the same plane as that which passes through the center-flange 6 of the fourth section 4.

The webs 7 in the various bar sections may slope at mutually different angles along the length of the bar, both between respective sections and within one and the same section.

FIGS. 4B–F illustrate further cross-sectional configurations which are additional to the basic form illustrated in FIG. 4A and which can be applied to a safety bar according to the present invention.

Figure 4G:
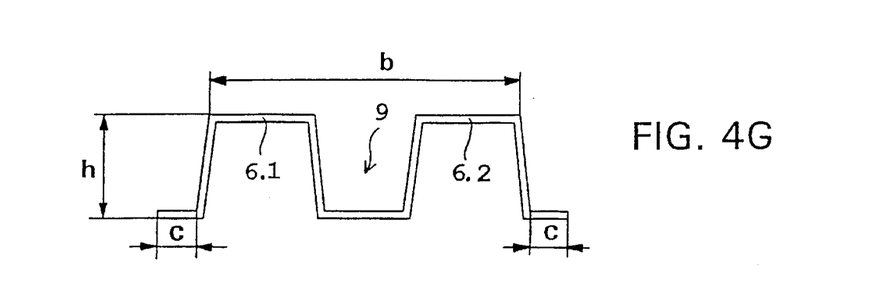

FIG. 4G illustrates a cross-sectional configuration of a safety bar which includes a channel 9 which extends in the bar center-flange and the bottom of which is located in the same plane as the two side-flanges 8. The two center-flange parts 6.1 and 6.2 respectively each preferably have the same form as that described earlier with respect to the single center-flange 6 illustrated in FIGS. 1–3. Alternatively, the form of the center-flange part 6.1 may deviate completely or partially from the form of the other center-flange part 6.2. Preferably the divided center-flange has a width (b) which extends between the outer webs of the bar, while the remaining dimensions of the bar can essentially correspond to those described above with reference to FIGS. 1–3. A safety bar of this configuration is particularly suited in those instances when available vertical space is limited for mounting the bar to a vehicle, for instance, such as a vehicle door.

Because the center-flange 6 of respective bar sections and the bar mounting parts 5 essentially lie in one and the same plane, the illustrated safety bar can essentially obtain a flat load-absorbing side. When the safety bar is subjected to load acting in the direction of the arrow (p) in FIG. 3, for instance when the vehicle is subjected to impact forces on that side of the vehicle in which the safety bar-is mounted, the center-flange 6 is essentially subjected to pressure forces along the length of the bar, while the side-flanges 8 are subjected to tension forces. The center-flange 6 may possibly buckle in a direction towards the interior of the bar. Because the width (b) of the center-flange 6 decreases towards the end of the bar and the width (c) of the side-flanges 8 decrease in the second section 2, and the height (h) decreases in the third section 3 and in the fourth section 4, the webs 7 of the safety bar are prevented from bending outwards, or such bending is at least made difficult, so as to more or less flatten the bar. It also lies with the purview of the invention to arrange the side-flanges 8 in one and the same plane.

Figure 5:
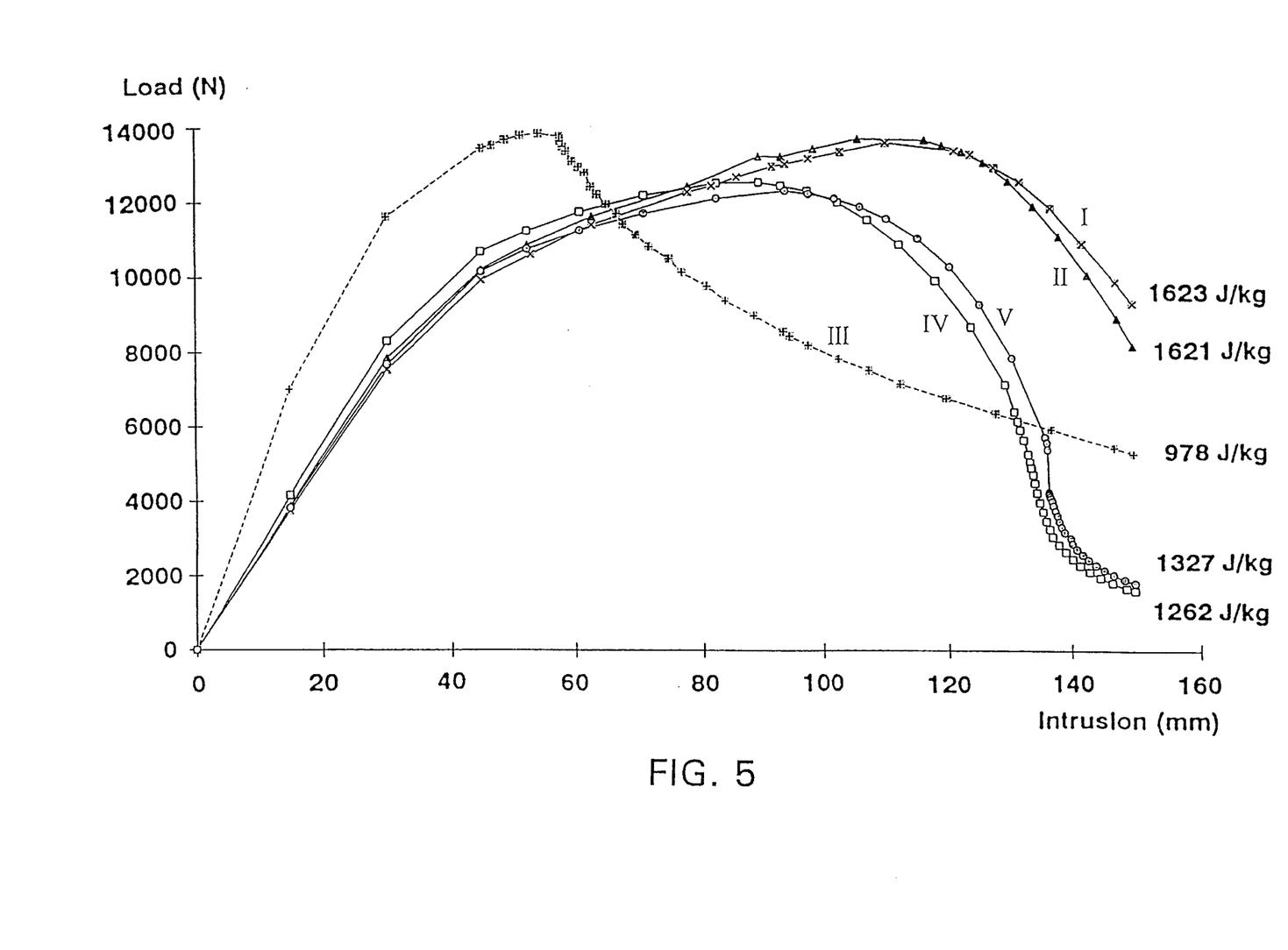
FIG. 5 illustrates intrusions with respect to different safety bars as a function of a load exerted thereon and as a function of the energy absorption capacity of respective bars.

FIG. 5 is a diagram which compares the energy-absorbing capacity, expressed in J/kg, of safety bars of different configurations. All of the safety bars concerned with the diagram of FIG. 5 have a length of about 900 mm and a maximum height (h) of about 40 mm. The metal plate has a thickness of about 1.6 mm.

The diagram illustrates bar intrusions in mm as a function of load in N. The safety bar takes up energy with intrusions of up to 150 mm, whereafter the surrounding structure, for instance in the form of vehicle frame components, begins to take up energy with intrusions of 150–300 mm. The weight in kg relates to the intrinsic weight of the bar, and the energy taken up by the bar in respective cases is represented by the area beneath its deformation curve.

The curves I–V in FIG. 5 relate to safety bars of essentially equal lengths and of identical cross-sectional configuration and size at the centers thereof, i.e. the first section 1, and have the following remaining characteristics:

Curve I represents a safety bar according to the present invention having a uniform first section 1.

Curve II represents an inventive safety bar according to the present invention which lacks a uniform first section 1.

Curve III represents a safety bar which has a uniform cross-section (similar to the first section I) along the full length of the bar.

Curve IV represents a safety bar in which the width of the center-flange 6 and the side-flanges 8 and the height of the webs 7 decrease linearly towards respective ends of the bar.

Curve V represents a safety bar in which the height of the webs 7 decreases from the center of the bar linearly towards the ends thereof, and in which the center-flanges 6 and the side-flanges 8 have an essentially constant width.

It will be seen from FIG. 5 that the safety bars according to the present invention represented by curves I and II are able to absorb much more energy than the safety bar represented by curve III (66%), and have an even greater energy absorption capacity than the safety bar represented by curve IV (28%) and the safety bar represented by curve V (22%). The greater energy absorption capacity of the safety bars according to the present invention can likely arise from tensile forces acting in the side-flanges 8 that create a moment of force which strives, or serves, to press the webs 7 in towards the bar interior. The magnitude of this moment of force can essentially depend on the reduction in the width (b) of the center-flange 6 and the width (c) of the side-flanges 8 in the second section 2 of the safety bars according to the present invention.

It should be pointed out that the configuration of the second section 2 can be of significance to the present invention. The combined length of the first section 1 and the adjacent second sections 2 will preferably constitute about 20–30% of the total length of the bar. The third section 3 and the fourth section 4 together can essentially form a transition part of trapezoidal configuration located between the second section 2 and the bar end 5. According to one embodiment of the invention, the bar is preferably constructed generally symmetrically around the first section 1 along the length of the bar.

Thus, in accordance with a preferred embodiment of the present invention, and as illustrated in FIGS. 1–3, a composite "middle section" of a safety bar, including two second sections 2 and, if present, a central first section 1, can preferably constitute between about 20% and about 30% of the total length of the bar. Accordingly, between about 70% and about 80% of the total length the bar can preferably be accounted for by the remaining sections of the bar, such as two third sections 3 and two-fourth sections 4. Collectively, a third section 3 and a fourth section 4 can be considered as forming a transition section between the aforementioned "middle section" and the corresponding end of the bar. Each such transition section can, by itself, thus preferably account for between about 35% and about 40% of the total length of the bar. Other dimensions and proportional relationships contemplated by at least one preferred embodiment of the present invention can be readily divined from FIGS. 1–3, which may be considered to be accurate, proportional and to scale.

According to another embodiment of the present invention, the bar is preferably constructed along its length generally symmetrically around two mutually connected second sections 2, in which case the first section 1 is excluded.

As stated heretofore, various possible configurations of the cross-section of a bar according to the present invention are shown in FIGS. 4A–4G. It is to be understood that the range of possible cross-sectional configurations of a bar according to the present invention is not limited to the variants shown in FIGS. 4A–4G.

Figure 6:
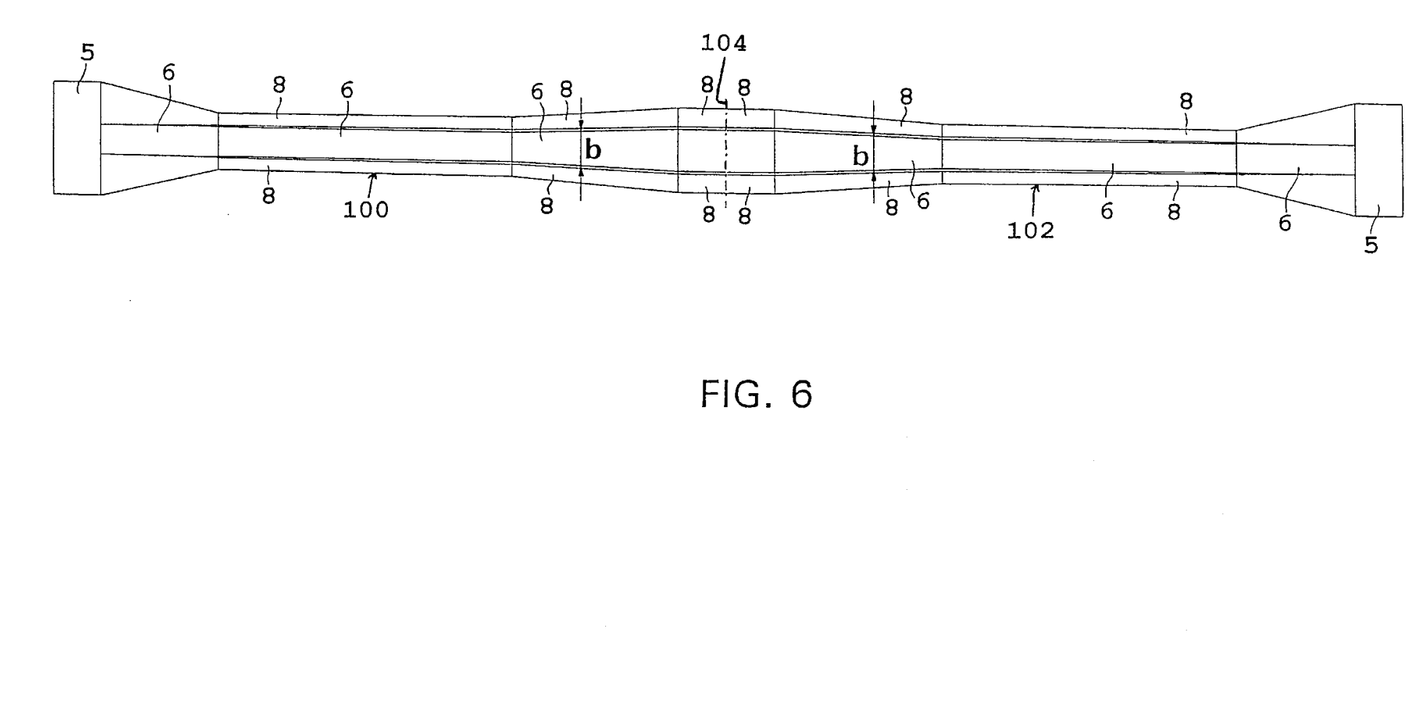
FIG. 6 illustrates a complete, symmetrical safety bar according to an embodiment of the present invention, as viewed directly from the load-absorbing side.

FIG. 6 illustrates a bar or beam, in accordance with a preferred embodiment of the present invention, having symmetrical portions 100 and 102. The balance of the reference numerals in FIG. 6 relate to components that have already been described in hereinabove with relation to FIG. 2. It will be understood that the symmetrical beam, having portions 100 and 102, shown in FIG. 6, is provided only as an example. Symmetrical portions 100 and 102 are preferably symmetrical with respect to one another about, or with respect to, a central plane 104.

It will be understood that the terms "bar" and "beam", as utilized throughout this disclosure, may be considered to be equivalent and interchangeable expressions.

It will be understood that the invention is not restricted to the illustrated and described embodiments thereof and that changes and modifications are conceivable within the scope of the claims included herewith.

One feature of the invention resides broadly in the bar construction, preferably a vehicle mounted safety bar for protection in the event of collisions, particularly side-on collisions, said bar having a generally trapezoidal and open cross-section which includes a center-flange 6 which is embraced by two webs 7, and a side-flange 8 which extends outwardly on each side of the bar and connects with a respective web 7, wherein the bar optionally includes a first section 1 of constant cross-section in the center part of the bar, characterized in that the bar includes at least one second section 2 which has a center-flange 6 whose width b decreases towards one end 5 of the bar; and in that a transition part 3,4 of generally trapezoidal shape is located between the second section 2 and said one bar end 5.

Another feature of the invention resides broadly in the bar construction characterized in that the second bar section 2 has side-flanges 8 whose widths c decrease towards one end of the bar.

Yet another feature of the invention resides broadly in the bar construction characterized in that the second bar section 2 has a generally constant height h.

Still another feature of the invention resides broadly in the bar construction characterized in that the transition part includes at least one third section 3 which includes a center-flange 6 of essentially constant width b and a height h which decreases towards one end of the bar.

A further feature of the invention resides broadly in the bar construction characterized in that the transition part comprises a fourth section 4 which includes a center-flange 6 of essentially constant width b and a height h which decreases towards one end of the bar down to the metal plate thickness of said bar.

Another feature of the invention resides broadly in the bar construction characterized in that the center-flanges 6 of respective bar sections lie in one and the same plane.

Yet another feature of the invention resides broadly in the bar construction characterized in that the side-flanges 8 of respective bar sections lie in one and the same plane.

Still another feature of the invention resides broadly in the bar construction characterized in that the center-flange 6 includes a channel 9 whose bottom may lie in the same plane as one or both of the side-flanges 8.

A further feature of the invention resides broadly in the bar construction characterized in that the bar is constructed generally symmetrically along its length around the first bar section 1.

Another feature of the invention resides broadly in the bar construction characterized in that the bar is constructed generally symmetrically along its length around two mutually connected second bar sections 2, said first bar section 1 being excluded from the bar construction.

In recapitulation, the present invention, according to at least one preferred embodiment, can generally relate to a bar construction, and preferably, but not exclusively, to a vehicle-mounted safety bar construction which provides protection in the event of collisions, in particular side collisions. The bar construction generally has a trapezoidal cross-sectional shape which is preferably open. The cross-sectional configuration of the bar includes a central flange which is embraced or flanked by two webs, each of which webs has, connecting therewith, a respective side-flange. Each side-flange extends outwardly on a respective side of the bar construction.

In further recapitulation, safety bar structures are used in several different aspects or contexts, although the use of such bars as a protective device in vehicles can be considered as perhaps the most common use. Another common application is the use of such bar structures as barriers along highways and roads to prevent vehicles from running off the road in the event of accidents. A vehicle-mounted safety bar, which is intended to counteract side-on collisions, is known from Swedish Patent Specification SE-C-434 245. As described therein, the safety bar has a closed cross-section which is constant along the full length of the bar. From the point of view of manufacture, however, it is preferred to provide the bar with an open cross-section, thereby resulting in lower manufacturing costs and also lower surface treatment costs against corrosion, etc. Hitherto known safety bars of open cross-section, however, have generally not been satisfactory with regard to their energy-absorbing capacity in relation to the weight of the bars. Bars of open cross-section have been found to require very large wall thicknesses in order to be able to withstand collision forces without tearing apart, i.e. so that the bar webs are not moved apart.

In yet further recapitulation, an object of the present invention is to provide a bar structure which is preferably intended as a vehicle-mounted safety bar for protection against side-on collisions and which has a generally trapezoidal cross-section, preferably being an open cross-section, wherein the drawbacks associated with hitherto known safety bars are eliminated.

In final recapitulation, in at least one preferred embodiment, the present invention can generally relate to a bar construction, preferably intended as a vehicle-mounted safety bar to protect against collisions, particularly against side-on collisions, comprising a generally trapezoidal and open cross-sectional configuration which includes a center-flange (6), two webs (7) which embrace the center-flange, and side-flanges (8) which extend outwardly from a respective side of the bar and connect with respective web (7). The bar may optionally include a first section (1) of constant cross-section in the center part of the bar. The bar includes at least one second section (2) which has a center-flange (6) whose width (b) decrease towards one end (5) of the bar. A transition part (3,4) of generally trapezoidal configuration is provided between the second section (2) and the end (5) of the bar. The second section (2) has side-flanges (8) whose widths (c) decrease towards one end of the bar. The second section (2) has a generally constant height (h).

Examples of automobile door arrangements, in which the present invention may be employed, may be found in the following U.S. Pat. Nos. 4,978,562, which issued to Wycech on Dec. 18, 1990; U.S. Pat. No. 3,938,288, which issued to Roubinet on Feb. 17, 1976; U.S. Pat. No. 4,861,097, which issued to Wycech on Aug. 29, 1989; U.S. Pat. No. 5,093,990, which issued to Klippel on Mar. 10, 1992.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Swedish Patent Application Nos. 9202769-7, filed on Sep. 25, 1992, and PCT/SE93/00760, filed on Sep. 20, 1993, having inventor Martin Jonsson, and SE-OS 9202769-7 and SE-PS 9202769-7 and International Application No. PCT/SE93/00760, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A bar construction, preferably a vehicle mounted safety bar for protection in the event of collisions, particularly side-on collisions, said bar having a generally trapezoidal and open cross-section which includes a center-flange which is embraced by two webs, and a side-flange which extends outwardly on each side of the bar and connects with a respective web, wherein the bar includes a first section of constant cross-section in a center part of the bar, wherein:

the bar includes at least one second section which has a center-flange whose width decreases towards one end of the bar, the second section has a generally constant height, a transition part of generally trapezoidal shape is located between the second section and said one bar end, and the transition part has a height which decreases towards one end of the bar.

2. A bar construction according to claim 1, wherein the second section has side-flanges whose widths decrease towards one end of the bar.

3. A bar construction according to claim 2, wherein the transition part includes at least one third section which includes a center-flange of essentially constant width and a height which decreases towards one end of the bar.

4. A bar construction according to claim 3, wherein the transition part comprises a fourth section which includes a center-flange of essentially constant width and a height which decreases towards one end of the bar down to the metal plate thickness of said bar.

5. A bar construction according to claim 4, wherein the center-flanges of respective sections lie in one and the same plane.

6. A bar construction according to claim 4, wherein the side-flanges of respective sections lie in one and the same plane.

7. A bar construction according to claim 5, wherein the center-flange includes a channel whose bottom may lie in the same plane as one or both of the side-flanges.

8. A bar construction according to claim 7, wherein the bar is constructed generally symmetrically along its length around the first section.

9. A bar construction according to claim 7, wherein the bar is constructed generally symmetrically along its length around two mutually connected second sections, said first section being excluded from the bar construction.

10. A bar construction according to claim 3, wherein the center-flange includes a channel whose bottom lies in the same plane as one or both of the side-flanges.

11. A bar construction according to claim 10, wherein the bar is constructed generally symmetrically along its length around the first section.

12. A bar construction according to claim 10, wherein the bar is constructed generally symmetrically along its length around two mutually connected second sections, said first section being excluded from the bar construction.

13. A bar construction, such as a vehicle-mounted safety bar for protection in the event of side-on collisions, said bar comprising:

a center-flange;

two webs each extending from respective sides of said center-flange;

said center-flange and said two webs combining to form at least a portion of a generally trapezoidal and open cross-section;

said bar having two ends and defining a longitudinal extent between two said ends;

said center-flange having a width defined transversely with respect to the longitudinal extent of said bar;

said bar having a height defined orthogonally with respect to the longitudinal extent of said bar and to the width of said center-flange;

said bar including a portion in which the width of said center-flange decreases towards one of said ends of said bar;

said bar portion having a generally constant height;

said bar further comprising a transition part that has a generally trapezoidal shape, said transition part being disposed between said bar section and said one end of said bar; and said transition part having a height that decreases towards said one end of said bar.

* * * * *

UNITED STATES PATENT AND TRADEMARK OFFICE
CERTIFICATE OF CORRECTION

PATENT NO. : 5,600,931
DATED : February 11, 1997
INVENTOR(S) : Martin JONSSON

It is certified that error appears in the above-indentified patent and that said Letters Patent is hereby corrected as shown below:

In column 5, line 52, after 'safety', delete "bar-is" and insert --bar is--.

In column 7, line 2, after 'and', delete "two-fourth" and insert --two fourth--.

In column 10, line 40, Claim 10, after 'claim', delete "3," and insert --6,--.

Signed and Sealed this

Twenty-second Day of July, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,600,931
DATED : February 11, 1997
INVENTOR(S) : Martin Jonsson

It is certified that error appears in the above-indentified patent and that said Letters Patent is hereby corrected as shown below:

On the title page, item [56], under the FOREIGN PATENT DOCUMENTS section, after the '0038941' reference, insert the following reference:
--2207039 6/1974 France--.

In column 5, line 52, after 'safety', delete "bar-is" and insert --bar is--.

In column 7, line 2, after 'and', delete "two-fourth" and insert --two fourth--.

In column 10, line 40, Claim 10, after 'claim', delete "3," and insert --6,--.

Signed and Sealed this

Eighteenth Day of November 1997

Attest:

BRUCE LEHMAN

*Attesting Officer*  *Commissioner of Patents and Trademarks*